United States Patent
Shen et al.

(10) Patent No.: US 8,353,811 B2
(45) Date of Patent: Jan. 15, 2013

(54) SMOKING ARTICLES ENHANCED TO DELIVER ADDITIVES INCORPORATED WITHIN ELECTROPROCESSED MICROCAPSULES AND NANOCAPSULES, AND RELATED METHODS

(75) Inventors: Zhihao Shen, Richmond, VA (US); Manuel Marquez, Midlothian, VA (US); Samuel I. Ogle, Colonial Heights, VA (US); William D. Thweatt, Chester, VA (US); Jon A. Regrut, Richmond, VA (US)

(73) Assignee: Phillip Morris USA Inc., Richmond, VA (US)

(*) Notice: Subject to any disclaimer, the term of this patent is extended or adjusted under 35 U.S.C. 154(b) by 658 days.

(21) Appl. No.: 12/153,761

(22) Filed: May 23, 2008

(65) Prior Publication Data
US 2009/0038628 A1   Feb. 12, 2009

Related U.S. Application Data

(60) Provisional application No. 60/924,734, filed on May 30, 2007.

(51) Int. Cl.
*B31C 99/00* (2009.01)
(52) U.S. Cl. ............ 493/47; 493/49; 131/337; 131/341
(58) Field of Classification Search .................. None
See application file for complete search history.

(56) References Cited

U.S. PATENT DOCUMENTS

| | | | | |
|---|---|---|---|---|
| 2,800,457 A | * | 7/1957 | Green et al. | 428/402.2 |
| 3,550,598 A | * | 12/1970 | McGlumphy et al. | 131/274 |
| 3,941,858 A | | 3/1976 | Shepherd et al. | |
| 4,253,473 A | * | 3/1981 | Marmo et al. | 131/275 |
| 4,689,186 A | | 8/1987 | Bornat | |
| 4,715,390 A | | 12/1987 | Nichols et al. | |
| 4,862,905 A | | 9/1989 | Green, Jr. et al. | |

(Continued)

FOREIGN PATENT DOCUMENTS
EP   1447074 A2   8/2004
(Continued)

OTHER PUBLICATIONS

Madene, Atmane et al., "Flavour encapsulation and controlled release—a review", Jan. 1, 2006, International Journal of Food Science and Technology, Blackwell Scientific Publications, Oxford, GB, pp. 1-21, XP002499388, ISSN: 0950-5423.

(Continued)

*Primary Examiner* — Michael J Felton
(74) *Attorney, Agent, or Firm* — Buchanan Ingersoll & Rooney PC

(57) ABSTRACT

A large variety of electroprocessed capsules can be produced to encapsulate a variety of additives within the subcompartments or substructures of the manufactured capsule. Furthermore, the manufactured capsules can be arranged within a filter of a smoking article during the manufacturing process. By modifying the various parameters that control the electrospraying or electrospinning processes, capsules can be manufactured that vary in composition, in substructural organization, and in dimension. A capsule produced by electrospraying comprises at least one polymeric material that encapsulates or supports the retention of at least one flavorant and/or non-flavorant within the capsule. A polymeric material provides a supporting structure for encapsulating at least one flavorant and/or non-flavorant additive. The capsules that can be produced by various electrospraying processes described below include microcapsules in a micro-scaled range, nanocapsules in a nano-scaled range, and various mixtures of microcapsules and nanocapsules.

14 Claims, 9 Drawing Sheets

U.S. PATENT DOCUMENTS

| | | | |
|---|---|---|---|
| 5,070,891 | A | 12/1991 | Rutherford |
| 5,144,966 | A | 9/1992 | Washington |
| 5,186,185 | A | 2/1993 | Mashiko et al. |
| 5,221,502 | A | 6/1993 | Washington |
| 5,413,122 | A | 5/1995 | Shu et al. |
| 5,724,997 | A | 3/1998 | Smith et al. |
| 6,325,859 | B1 | 12/2001 | De Roos et al. |
| 6,325,860 | B1 | 12/2001 | Coleman, III |
| 6,428,624 | B1 | 8/2002 | Coleman, III |
| 6,761,174 | B2 | 7/2004 | Jupe et al. |
| 2005/0116070 | A1* | 6/2005 | Ganan Calvo et al. ....... 239/706 |
| 2007/0012327 | A1* | 1/2007 | Karles et al. ................. 131/337 |
| 2008/0149119 | A1 | 6/2008 | Marquez et al. |

FOREIGN PATENT DOCUMENTS

| | | |
|---|---|---|
| WO | WO90/08478 | 8/1990 |
| WO | WO91/07101 | 5/1991 |
| WO | WO02/060275 A1 | 8/2002 |
| WO | WO 2004/080217 A1 | 9/2004 |
| WO | WO2004/103510 A2 | 12/2004 |
| WO | WO2007/036814 A2 | 4/2007 |

OTHER PUBLICATIONS

International Preliminary Report on Patentability issued Dec. 1, 2009 for PCTIB2008/002428.

Zahr, Alisar S. et al., Encapsulation of Drug Nanoparticles in Self-Assembled Macromolecular Nanoshells, Departments of Chemical Engineering, Chemistry, and Materials Science & Engineering, The Pennsylvania State University, University Par, Pennsylvania 16802, and Department of Basic Pharmaceutical Sciences, School of Pharmacy, University of Louisiana at Monroe, Monroe Louisiana 71209, Langmuir 2005, 21, 403-410, 2005 American Chemical Society.

Kessick, Royal et al., The use of AC potentials in electrospraying and electrospinning processes, Department of Chemical Engineering, Virginia Commonwealth University, Richmond VA 23284, USA, Department of Chemistry, Virginia Commonwealth University, Richmond VA 23284, USA, 2004 Elsevier Ltd.

Boland, Eugene D. et al., "Tailoring Tissue Engineering Scaffolds Using Electrostatic Processing Techniques: A Study of Poly(Glycolic Acid) Electrospinning," Journal of Macromolecular Science, Pat A, 38: 12, 1231-1243 (2001), Marcel Dekker, Inc.

Dersch, R. et al., "Electrospun Nanofibers: Internal Structure and Intrinsic Orientation," Journal of Polymer Science: Part A: Polymer Chemistry, vol. 41, 545-553 (2003) Wiley Periodicals, Inc.

Gordon, Vernita D. et al., "Self-Assembled Polymer Membrane Capsules Inflated by Osmotic Pressure," J. American Chemical Society, 2004, 126, 14117-14122.

Jang, Sung-Yeon et al., "Rapid Direct Nanowriting of Conductive Polymer via Electrochemical Oxidative Nanolithography," J. Am. Chem. Soc. 2004, 126, 9476-9477.

Larsen, Gustavo et al., "Use of Coaxial Gas Jackets to Stabilize Taylor Cones of Volatile Solutions and to Induce Particle-to-Fiber Transitions," Adv. Mater. 2004, 16, No. 2, Jan. 16, 166-169.

Li, Dan et al., "Electrospinning Nanofibers as Uniaxially Aligned Arrays and Layer-by-Layer Stacked Films," Adv. Mater. 2004, 16, No. 4, Feb. 17, 361-366.

Li, Dan et al., "Electrospinning of Nanofibers: Reinventing the Wheel?," Adv. Mater. 2004, 16, No. 14, Jul. 19, 1151-1170.

Li, Dan et al., "Electrospinning of Polymeric and Ceramic Nanofibers as Uniaxially Aligned Arrays," Nano Letters, 2003, vol. 3, No. 8, 1167-1171, American Chemical Society.

Li, Dan et al., "Use of Electrospinning to Directly Fabricate Hollow Nanofibers with Functionalized Inner and Outer Surfaces," small 2005, 1, No. 1, 83-86.

Loscertales, Ignacio G. et al., "Electrically Forced Coaxial Nanojets for One-Step Hollow Nanofiber Design," J. American Chemical Society, 2004, 126, 5376-5377.

Loscertales, Ignacio G. et al., "Micro/Nano Encapsulation via Electrified Coaxial Liquid Jets," Science vol. 295, Mar. 1, 2002, 1695-1698.

Loscertales, Ignacio G. et al., "Production of Complex Nano-Structures by Electro-Hydro-Dynamics," Mater. Res. Soc. Symp. Proc. vol. 860E 2005 Materials Research Society (6 pages).

Shin, Y.M. et al., "Experimental Characterization of Electrospinning: The Electrically Forced Jet and Instabilities," Polymer 42 (2001) 9955-9967.

Sun, Zaicheng et al, "Compound Core-Shell Polymer Nanofibers by Co-Electrospinning," Adv. Mater. 2003, 15, No. 22, Nov. 17, 1929-1932.

Sundaray, Bibekananda et al., "Electrospinning of Continuous Aligned Polymer Fibers," Applied Physics Letters, vol. 84, No. 7, Feb. 16, 2004, 1222-1224.

Theron, A. et al., " Electrostatic Field-Assisted Alignment of Electrospun Nanofibers," Institute of Physics Publishing, Nanotechnology 12 (2001) 384-390, PII: S0957-4484(01)25671-2.

Yu, Jian H. et al., "Production of Submicrometer Diameter Fibers by Two-Fluid Electrospinning," Adv. Mater. 2004, 16, No. 17, Sep. 3, 1562-1566.

* cited by examiner

US 8,353,811 B2

SMOKING ARTICLES ENHANCED TO DELIVER ADDITIVES INCORPORATED WITHIN ELECTROPROCESSED MICROCAPSULES AND NANOCAPSULES, AND RELATED METHODS

CROSS REFERENCE TO RELATED APPLICATIONS

This application claims priority under 35 U.S.C. §119(e) to U.S. provisional Application No. 60/924,734, filed May 30, 2007, the entire content of which is incorporated herein by reference.

BACKGROUND

The taste of mainstream smoke from smoking articles containing tobacco can be enhanced by incorporating various flavor-enhancing agents ("flavorants") as additives into the smoking articles. For instance, tobacco smoke passing through a carbon sorbent material can lose favorable taste attributes. Thus, adding various flavorants back into tobacco smoke to replace lost flavorants is desirable. However, the enhancement in the taste of smoking articles by known methods is not long-lasting and may result in products having inconsistent flavor. Volatile flavors incorporated into smoking products are not stably retained. Flavorants inadvertently migrate into sorbents of cigarette filters capable of removing gas-phase constituents. Flavorants superficially applied to either the tobacco-containing portion or the packaging portion of cigarette products are irreversibly lost. Furthermore, flavorant molecules may be chemically modified at high internal temperatures generated during smoking use, and may produce byproducts that exhibit one or more undesirable tastes. Thus, there is a continuing interest in producing tobacco-containing, smoking articles that are modified to provide consistent and controlled delivery of a large variety of additives, including flavorants and/or non-flavorant additives, to smokers during use.

SUMMARY

In several embodiments, various methods for producing different types of capsules by electrospraying are described. The capsules produced by electrospraying include microcapsules in a micro-scaled range, nanocapsules in a nano-scaled range, and mixtures of microcapsules and nanocapsules. The manufactured capsules can be incorporated into various filters for producing a large variety of flavor-enhanced smoking articles. In various embodiments, a filter comprises a plurality of capsules, in which all or a portion of the capsules can be produced by electrospraying.

In another embodiment, a capsule produced by electrospraying is incorporated into a filter of a smoking article, in which the capsule comprises at least one polymeric material that encapsulates or supports the retention of at least one flavorant and/or non-flavorant additive.

In another embodiment, a "core-shell" capsule produced by electrospraying is incorporated into a filter of a smoking article, in which the "core-shell" capsule comprises at least one flavorant and/or non-flavorant additive formed as an inner core, and at least one polymeric material formed as an outer shell that encapsulates the contents of the inner core. Flavorants and/or non-flavorant additives encapsulated in the inner core can be released by interacting with constituents in the mainstream smoke.

In another embodiment, a "two-phase" matrix capsule produced by electrospraying is incorporated into a filter of a smoking article, in which the "two-phase" matrix capsule comprises at least one polymeric material in a continuous phase and at least one flavorant and/or non-flavorant additive in a dispersed phase in the form of a micro-emulsion. Flavorants and/or non-flavorant additives encapsulated in the dispersed phase can be released by interacting with constituents in the mainstream smoke.

In another embodiment, a "copolymer micelle" capsule produced by electrospraying is incorporated into a filter of a smoking article, in which the "copolymer micelle" capsule comprises a sacrificial polymer or a non-sacrificial polymer formed as an outer shell. Flavorants and/or non-flavorant additives encapsulated in the inner core can be released by interacting with constituents in the mainstream smoke.

In another embodiment, a "beads-on-a-string" fiber that incorporates beads/capsules along the length of a fiber during electrospinning, is incorporated into a filter of a smoking article, in which the beads/capsules comprise a sacrificial polymer or a non-sacrificial polymer. Flavorants and/or non-flavorant additives encapsulated within the beads/capsules can be released by interacting with constituents in the mainstream smoke.

DETAILED DESCRIPTION

Figure 1:
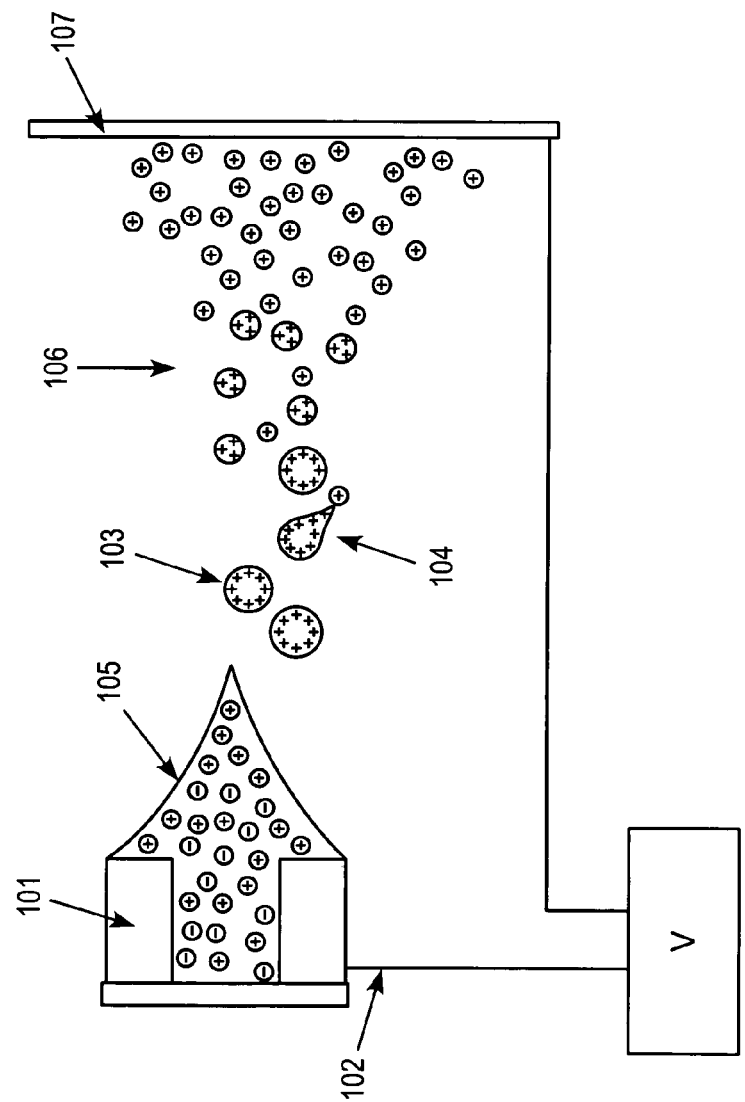
FIG. 1 is a schematic of an exemplary electrospraying apparatus for producing microcapsules and nanocapsules.

Smoking articles containing tobacco, such as cigarettes, can be manufactured to contain various additives, including flavorants and non-flavorant additives such as cooling agents, diluents, and aerosol formers, that can be added directly to a tobacco blend during processing. An improved method is provided for stabilizing the incorporation of additives into such smoking articles by encapsulating the additive molecules into stable forms of a capsule, and by incorporating such stable capsules into various filters of smoking articles. The described methods can produce smoking articles containing additives that exhibit an increased shelf life so that such smoking products can deliver more flavor to users compared to smoking products manufactured by other known methods.

Various embodiments described herein provide methods for introducing additives of interest into a filter of a smoking article by incorporating capsules that encapsulate a large variety of additives within the subcompartments or substructures of the manufactured capsules. By modifying the various parameters that control the electrospraying process that produces charged droplets of composite material that form as microcapsules and nanocapsules, a variety of capsules can be manufactured that vary in composition, in substructural organization, and in dimension. Additives suitable for incorporation into various filters of smoking articles include flavor-enhancing agents ("flavorants") and/or any agent exhibiting chemical or physical properties of interest ("non-flavorants") that may be optionally included within the manufactured capsules to achieve a desired product. Examples of non-flavorants include cooling agents, diluents, aerosol formers, and many other equivalents.

In the present disclosure, the term "electroprocessed" includes and refers to electrospraying and electrospinning processes known by persons skilled in the art. The terms "capsule" or "capsules" or "beads" refer to a material, or a form of a material, that can be produced by electrostatic processes, in which the material comprises at least one polymeric material that encapsulates or supports the retention of at least one flavorant or non-flavorant within the capsule. The polymeric material provides a supporting structure for encapsulating at least one flavorant or non-flavorant additive. The capsules that can be produced by various electrospraying processes described below include "microcapsules" in a micro-scaled range (measured in units of micrometer or μm), "nanocapsules" in a nano-scaled range (measured in units of nanometer or nm), and various mixtures of microcapsules and nanocapsules. The microcapsules in the micro-scaled range include capsules having an outer diameter from about 100 nm to about 50 μm, from about 100 nm to about 40 μm, from about 100 nm to about 30 μm, from about 100 nm to about 20 μm, from about 100 nm to about 10 μm, from about 100 nm to about 5 μm, from about 100 nm to about 4 μm, from about 100 nm to about 3 μm, from about 100 nm to about 2 μm, from about 100 nm to about 1 μm. The nanocapsules in the nano-scaled range include capsules having an outer diameter from about 1 nm to about 100 nm, from about 1 nm to about 95 nm, from about 1 nm to about 90 nm, from about 1 nm to about 85 nm, from about 1 nm to about 80 nm, from about 1 nm to about 75 nm, from about 1 nm to about 70 nm, from about 1 nm to about 65 nm, from about 1 nm to about 60 nm, from about 1 nm to about 55 nm, from about 1 nm to about 50 nm, from about 1 nm to about 45 nm, from about 1 nm to about 40 nm, from about 1 nm to about 35 nm, from about 1 nm to about 30 nm, from about 1 nm to about 25 nm, from about 1 nm to about 20 nm, from about 1 nm to about 15 nm, from about 1 nm to about 10 nm, from about 1 nm to about 5 nm. In one preferred embodiment, the capsules have an outer diameter in a range from about 20 nm to about 10 μm. In another preferred embodiment, the capsules have an outer diameter in a range from about 20 nm to about 3 μm.

FIG. 1 is a schematic of an exemplary electrospraying apparatus for producing microcapsules and nanocapsules. In FIG. 1, the exemplary apparatus includes a source for providing a continuous supply of a flowable material, or a fluid, that must pass through an opening of a spinneret 101, forming a droplet of the flowable material. An electrostatic field is generated by a DC high-voltage power source applied to a spinneret 101. A charge can be imparted to the fluid either by contacting the capillary, or the fluid within the capillary, with a high voltage electrode 102. The viscosity of the fluids within the capillaries of an electrospinning apparatus affects the stability of the process dependent on electrostatic and fluid dynamic conditions. A Taylor Cone 105 is established in an electrostatic field that results in the production of a jet of fluid. Rayleigh instabilities break-up the emitted jet into a spray of charged droplets 103, 104, and 106 at sufficiently high voltage and sufficiently low molecular weight of the fluid. The charged droplets or charged capsules are deposited on a grounded target collector 107 that reestablishes electrical neutrality. The capsules produced by electrospraying may exhibit a broad range in diameter from about several nanometers (nm) to about several micrometers (μm).

Figure 2A:
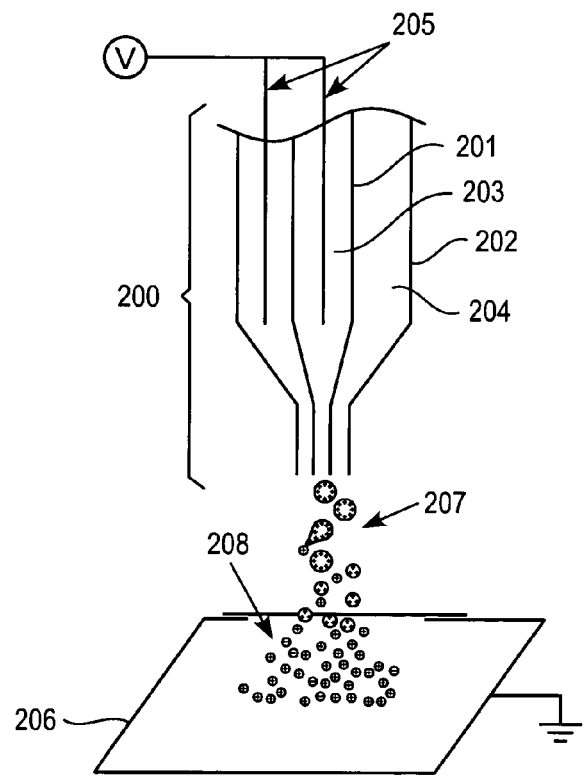
FIG. 2A is a schematic of a co-axial electrospraying apparatus for producing composite microcapsules and composite nanocapsules.

FIG. 2A is a schematic of a co-axial electrospraying apparatus for producing composite microcapsules and composite nanocapsules. In FIG. 2A, a spinneret 200 is shown comprising two co-axial capillaries, in which an inner capillary 201 along the center axis is loaded with a first material 203 that forms a core of a capsule, and an outer capillary 202 concentrically surrounding the inner capillary 201 is loaded with a second material 204 that forms the outer shell of a capsule. Within the spinneret 200, the flowable materials 203 and 204 are under capillary forces. The flowable materials 203 and 204 in both capillaries can be maintained at a high potential relative to a grounded target 206 such as a collection plate, for example. The first flowable material 203 of the inner capillary 201 and the second flowable material 204 of the outer capillary 202 can exit both capillaries from a common nozzle, and can be extruded as components of a single capsule 207 and 208. The first material 203 and the second material 204 within the capillaries can be maintained at a desired potential by applying the potential to a conductive spinneret, in which each capillary is conductive but electrically isolated from the other capillary. Alternatively, the first and second materials, 203 and 204 respectively, within the capillaries can be maintained at a desired potential by applying the potential to conductive electrodes 205 that can be inserted directly into the material contained within each capillary. When the electrodes are conductive, the capillaries may be conductive or non-conductive.

In FIG. 2A, the co-axial electrospraying apparatus includes a spinneret that includes a capillary or a set of co-axial capillaries, in which each subset of capillaries may be designated to extrude different flowable materials, or fluids. During the electrospraying process, micro-scaled and nano-scaled droplets of flowable material emerge from the opening of a spinneret by applying a strong electric field. A charge can be imparted into the flowable material through contact with either a high-voltage electrode within the capillary, or with the capillary itself. The application of a high voltage imparts a surface charge on the droplets that form a capsule containing a fluid of interest. At sufficiently high voltage, a Taylor Cone can be formed in which droplets of material are ejected from the tip of the cone. Within the Taylor Cone, capsules having micro-scaled and nano-scaled diameters can be produced from a spinneret. The capsules produced by electrospraying can be deposited onto a grounded target collector.

In general, additives selected for incorporation into capsules include any material that can be extruded through a spinneret. In one embodiment, additives suitable for extrusion include non-viscous forms of polymers, gels, liquids, or melts. In another embodiment, additives suitable for extrusion include viscous forms of polymers, gels, liquids, or melts that can be combined with solvents, emulsifiers, or polymerizers to achieve a desired viscosity. Solvents capable of dissolving an additive of interest and capable of producing a flowable material are suitable for electrospraying processes. For example, suitable solvents include N,N-Dimethyl formamide (DMF), tetrahydrofuran (THF), methylene chloride, dioxane, ethanol, chloroform, water, equivalent solvents, and various combinations thereof. To obtain a desired surface tension of an electrospraying fluid, various surfactants, and mixtures thereof can be added to the electrospraying fluid. A variety of salts and mixtures thereof can be added to the electrospraying fluid exhibiting electric conductivity at the lowest range. For example, lithium chloride is suitable as an inorganic salt that can be added to the electrospraying fluid to increase the electric conductivity of the fluid, and is removed by evaporation during the electrospraying process. If menthol is included as an additive of interest, the menthol is preferably combined with a liquid solvent, such as an oil or an emulsifier, to achieve the desired viscosity prior to the extrusion step. Alternatively, materials can be pre-heated or heated during the electrospraying process to achieve the desired viscosity.

For embodiments directed to various capsules described herein, the capsules comprise "sacrificial polymers" and/or "nonsacrificial polymers." Sacrificial polymers can be modified in at least two ways, by heating (i.e., inducing a thermal transition that results in a reversible change in the physical state of the polymer due to an increase in the temperature of the filter of a smoking article by melting the polymer from a solid state to a liquid state), and by chemical decomposition that results in an irreversible chemical change of the polymer due to interactions with constituents of mainstream smoke of a smoking article at elevated temperatures reached during smoking. Non-sacrificial polymers are also subject to chemical decomposition upon interactions with constituents of mainstream smoke of a smoking article at elevated temperatures reached during smoking. By controlling the composition of the capsule, a suitable combination of sacrificial polymers and non-sacrificial polymers may be employed to produce a capsule that selectively releases various additives from the retention or encapsulation within a filter, mediated by sacrificial and non-sacrificial polymers.

Sacrificial polymers incorporated into the capsules can undergo a thermal transition that reduces the structural integrity of a sacrificial polymer when the temperature of the filter exceeds the glass transition temperature or the melting temperature of the sacrificial polymer. The sacrificial polymer that can be subjected to thermal transition, by heating for example during the manufacturing process, is selected from the group consisting of: poly(ethylene oxide) (PEO), polylactide (PLA), polyglycolide (PGA), polycaprolactone (PCL), polyhydroxybutyrate (PHB), polyhydroxyvalerate (PHV), polyvinyl alcohol (PVA), polyetherketone (PEK), polyoxytrimethylene, atactic polypropylene, low density polyethylene, poly(alkyl siloxane), poly(butylene adipate), polyacrylate, polymethacrylate, and polyitaconate. Examples of polymers having a low melting point include PEO, polyoxytrimethylene, atactic polypropylene, low density polyethylene (LDPE), poly(alkyl siloxane), poly(butylene adipate). Examples of polymers having a low glass transition temperature include polyacrylates, polymethacrylates, and polyitaconates. Suitable polymers include water-soluble polymers, or hydrolyzable polymers, such as PEO, PLA, PGA, PCL, PHB, PHV, PVA, PEK, and various polyanhydrides. Other homopolymers known by persons skilled in the art can be employed as sacrificial polymers. In one embodiment, the structural integrity of the sacrificial polymer subjected to thermal transition is reduced by at least 1% from that of the initial unsmoked state of the filter. In a preferred embodiment, the structural integrity of the sacrificial polymer subjected to thermal transition is reduced by at least 5%, at least 10%, at least 15%, at least 20%, at least 25%, at least 30%, at least 35%, at least 40%, at least 45%, and at least 50% from that of the initial unsmoked state of the filter.

Sacrificial polymers incorporated into the capsules can undergo a chemical decomposition that reduces the structural integrity of a sacrificial polymer when the temperature of the filter reaches a sufficient temperature to break chemical bonds of the sacrificial polymer. For example, chemical decomposition can result in the decomposition of polymers to monomers and in the cleavage of functional groups from monomers. Suitable sacrificial polymers include polymers that can be subjected to thermal decomposition at a sufficiently high temperature such as various thermally degradable polymers and thermally degradable epoxy resins, including starch-based thermally degradable polymers. Suitable polymer for use as a sacrificial polymer includes any type of polymer that can be subjected to chemical decomposition under temperatures reached within the smoking filter during smoking and/or can interact with constituents of a mainstream smoke during smoking. In one embodiment, the structural integrity of the sacrificial polymer subjected to chemical decomposition is reduced by at least 1% from that of the initial unsmoked state of the filter. In a preferred embodiment, the structural integrity of the sacrificial polymer subjected to chemical decomposition is reduced by at least 5%, at least 10%, at least 15%, at least 20%, at least 25%, at least 30%, at least 35%, at least 40%, at least 45%, and at least 50% from that of the initial unsmoked state of the filter.

Copolymers known by persons skilled in the art can be employed as sacrificial polymers. Copolymers are polymers comprising two or more different types of monomers that are linked together in the same polymer chain. Suitable copolymers for producing a sacrificial polymer include copolymers composed of monomers of homopolymers described above and copolymers comprising both monomers of homopolymers described above and monomers of other types of polymers known to persons skilled in the art. Examples of suitable copolymers include random copolymers, graft copolymers, and block copolymers. Examples of suitable polymers include linear polymers, star polymers, and cross-linked polymers.

By controlling the parameters that regulate an electrospraying process, a large variety of capsules exhibiting specialized characteristics can be produced. A spinneret-target collector voltage, Vsc, may be set in the 2-20 kV range, and is preferably set in the 5-15 kV range. The distance between the charged tip of the capillaries and the grounded target can be set from about 3-25 cm, and is preferably set from about 5-20 cm. A feed rate for a polymer solution can be set from about 0.02-2.0 mL/hr, and a preferred feed rate is set from about 0.05-1.0 mL/hr. The feed rate of an additive in a solution can be set from about 0.02-2 mL/hour, and a preferred feed rate is set from about 0.05-1 mL/hour. The concentration of a polymer in solution can be set from about 0.5-40 wt % range, and is preferably set from about 0.2-10 wt % range, and is preferably in the 0.5-5 wt % range. The concentration of an additive can be set from about 1-100 wt % range, and is preferably set from about 10-50 wt % range. The outer diameter of the outer capillary can be set from about 0.1-5 mm, and is preferably set from about 0.2-1 mm, while the diameter of the inner capillary can be set from about 0.05-2 mm, and is preferably set from about 0.07-0.7 mm. The capillaries may be composed of stainless steel, glass, or polymers. When stainless steel or other conductive capillaries are employed, the spinneret-target collector voltage can be applied between the collector and the capillaries. If non-conductive capillaries are employed, conductive electrodes may be inserted into the liquids to promote electrical contact. Electrospraying performed according to these parameters with a liquid feed rate of 0.5 mL/hour can result in a production rate of 20-500 mg/hour of capsule.

Figure 2B:
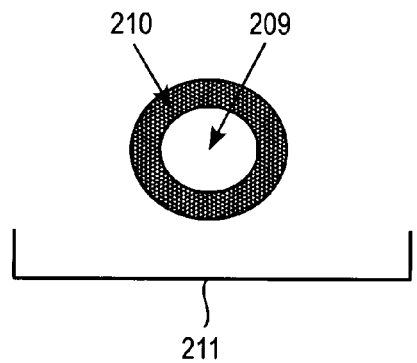
FIG. 2B is a schematic of a "core-shell" capsule produced by co-axial electrospraying.

FIG. 2B is a schematic of a "core-shell" capsule produced by co-axial electrospraying, as another embodiment. In FIG. 2B, a "core-shell" capsule 211 represents an exemplary two-component capsule produced by the electrospraying method illustrated in FIG. 2A. In FIG. 2A, when the inner capillary 203 is loaded with a flavorant and/or a non-flavorant additive as the first flowing material and the outer capillary 204 is loaded with a polymer as the second flowing material, the electrospraying process produces a capsule comprising a flavorant and/or a non-flavorant additive within an inner core 209, and a polymer as an outer shell 210. The capsules produced are nominally spherical in shape and have approximately constant diameters. In one preferred embodiment, the "core-shell" capsules have an outer diameter in a range from about 20 nm to about 10 µm. In another preferred embodiment, the "core-shell" capsules have an outer shell thickness in a range from about 20 nm to about 3 µm.

Various combinations of flavorants and/or other additives can be loaded within the inner capillary 201 of a spinneret as shown in FIG. 2A, and can be encapsulated within the inner core 209 of a capsule as shown in FIG. 2B. For example, suitable flavorants include menthol, eugenol, spearmint, peppermint, cocoa, vanilla, cinnamon, licorice, citrus or other fruit flavors, and combinations thereof. Examples of non-flavorant additives include cooling agents, diluents, aerosol formers, and equivalents. In a preferred embodiment, menthol is incorporated into the capsules of smoking articles as a cooling agent and as a flavorant.

Figure 3A:
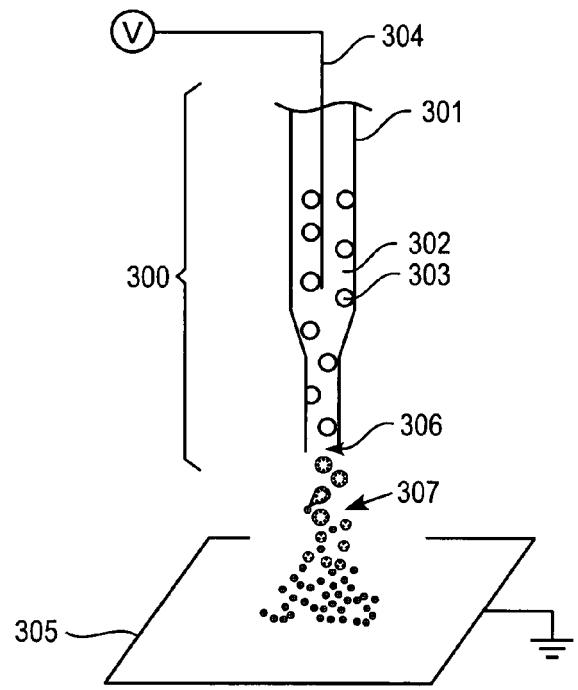
FIG. 3A is a schematic of a spinneret that includes a single capillary that can extrude a "two-phase" matrix capsule produced by electrospraying.

FIG. 3A is a schematic of a spinneret that includes a single capillary that can extrude a "two-phase" matrix capsule produced by electrospraying, as another embodiment. In FIG. 3A, a first material comprising a sacrificial polymer and a second material comprising a flavorant and/or a non-flavorant additive can be loaded into a single-capillary spinneret 300 that includes a single capillary 301. Within the capillary 301, the first material 302 comprising the sacrificial polymer is formed in a continuous phase, and the second material 303 comprising a flavorant and/or a non-flavorant additive is formed in a dispersed phase. The first and second materials, 302 and 303 respectively, are combined as a micro-emulsion, and the mixture is maintained at a desired potential by applying a potential to the conductive electrode 304 inserted directly into the mixture of materials contained within the capillary. The potential of the conductive electrode is relative to the potential of a collection plate that serves as a grounded target 305. The "two-phase" matrix material representing a mixture of the two materials exits the nozzle 306. The "two-phase" matrix capsule 307 produced by the electrospraying process can be collected on the grounded target.

Figure 3B:
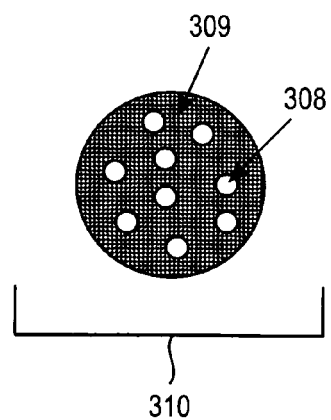
FIG. 3B is a schematic of a partially exploded view of the "two-phase" matrix capsule illustrated in FIG. 3A, in which the "two-phase" matrix capsule comprises a polymer matrix as a first phase and a droplet of flavorants and/or non-flavorant additives as a second phase.

FIG. 3B is a schematic of a partially exploded view of the "two-phase" matrix capsule illustrated in FIG. 3A, in which the "two-phase" matrix capsule comprises a polymer matrix as a first phase and a droplet of flavorants and/or non-flavorant additives as a second phase, as another embodiment. In FIG. 3B, an exemplary "two-phase" matrix capsule 310 produced by the electrospraying process shown in FIG. 3A is depicted. The first material comprising the sacrificial polymer 302, and the second material 303 comprising at least one flavorant and/or non-flavorant additive are combined to produce a "two-phase" matrix capsule comprising a matrix of sacrificial polymer formed as a continuous phase 309, and a droplet of flavorants and/or non-flavorant additives formed as a dispersed phase 308. When "two-phase" matrix capsules within a filter of a smoking article become exposed to a mainstream smoke containing particulates, including water vapor, the flavorants and/or non-flavorant additives dispersed throughout the matrix structure comprising a sacrificial polymer are gradually released due to processes of thermal transition and/or chemical decomposition of the sacrificial polymer during smoking.

Figure 4A:
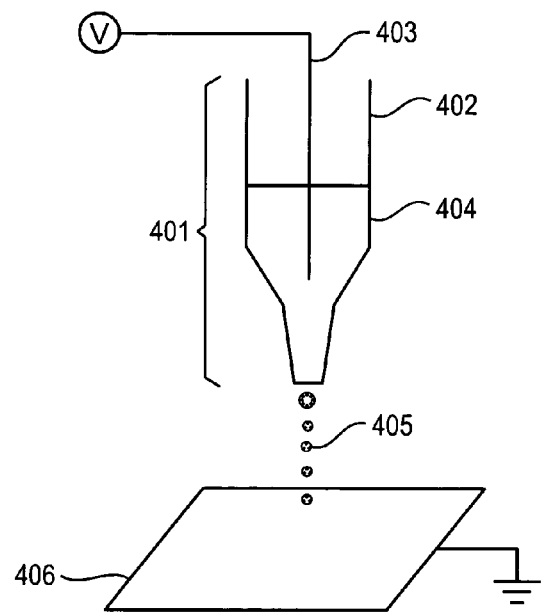
FIG. 4A is a schematic of an electrospraying apparatus including a single-capillary spinneret loaded with a mixture of block copolymers and flavorants for producing "copolymer micelle" capsules.

FIG. 4A is a schematic of an electrospraying apparatus including a single-capillary spinneret loaded with a mixture of block copolymers and flavorants for producing "copolymer micelle" capsules. In FIG. 4A, a spinneret 401 is shown comprising a single capillary 402 electrically charged 403 and loaded with a mixture 404 of block copolymers and flavorants and/or non-flavorant additives. The block copolymer molecules and flavorant molecules can be assembled together at the molecular level to produce capsules in a micelle form before such mixture is subjected to an electrospraying procedure. The capsules may be formed before or after loading into the single capillary 402. The "copolymer micelle" capsules 405 containing flavorants and/or non-flavorant additives are deposited on a grounded target collector 406.

Figure 4B:
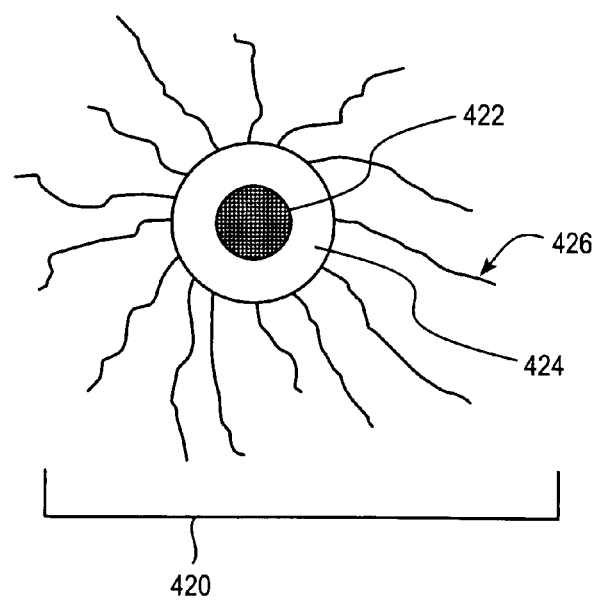
FIG. 4B is a schematic of a "copolymer micelle" capsule produced by electrospraying according to FIG. 4A.

FIG. 4B is a schematic of a "copolymer micelle" capsule produced by electrospraying according to FIG. 4A. In FIG. 4B, an exemplary "copolymer micelle" capsule 420 is shown, in which the flavorants and/or non-flavorant additives are formed as the inner core 422 and block copolymers are formed as the outer shell 424.

Figure 4C:
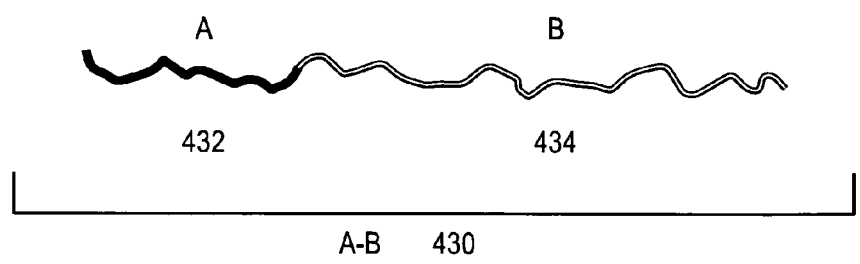
FIG. 4C is a schematic of a block copolymer comprising a block polymer A and a block polymer B.

FIG. 4C is a schematic of a block copolymer comprising a block polymer A and a block polymer B. In FIG. 4C, a block copolymer 430 is shown, as a continuous polymer chain comprising two or more different polymers covalently bonded together end-to-end. For example, if two different polymers, "A" 432 and "B" 434, are combined to form a block copolymer "A-B" 430, then a monomer subunit positioned at the end of the first polymer chain "A" 432 is covalently bonded to a monomer subunit positioned at the end of the second polymer chain "B" 434. In general, a micelle structure, such as the "copolymer micelle" capsule 420 illustrated in FIG. 4B, is formed by mixing together molecules having differential affinities for other types of molecules in a mixture. For example, a "copolymer micelle" capsule 420 illustrated in FIG. 4B is formed by mixing together block copolymers and flavorants in a solvent, in which the flavorants can interact strongly with a portion of the block copolymer (e.g., block polymer "B" 434). Flavorants may be internally directed within the core of such capsules, if the block polymer "B" 434 of the block copolymer "A-B" 430 is not as soluble in the solvent as is the block polymer "A" 432 of the block copolymer so that the block polymer "B" 434 forms a shell surrounding a core of flavorants and the block polymer "A" 432 of the block copolymer forms long-extensions 426 into the solvent as shown in FIG. 4B.

The polymers constituting a block copolymer may be sacrificial or non-sacrificial. During smoking, the flavorants and/or non-flavorant additives can be released from the "copolymer micelle" capsule when the mainstream smoke constituents chemically decompose the outer shell or provide thermal heating to promote thermal transition of the copolymers. As one embodiment, a "copolymer micelle" capsule is produced by an electrospraying process employing a single capillary spinneret, in which the "copolymer micelle" capsule comprises a non-sacrificial copolymer formed as an outer shell and at least one flavorant and/or non-flavorant additive formed as an interior core, in which the flavorants and/or non-flavorant additives are released from the "copolymer micelle" capsule when exposed to mainstream smoke. As another embodiment, a "copolymer micelle" capsule is produced by an electrospraying process employing a single capillary, in which the "copolymer micelle" capsule comprises a sacrificial copolymer formed as an outer shell and at least one flavorant and/or non-flavorant additive formed as an inner core, in which the flavorants and/or non-flavorant additives are released from the "copolymer micelle" capsule when exposed to mainstream smoke. A sacrificial copolymer is any block copolymer that comprises a sacrificial polymer subunit.

Figure 5B:
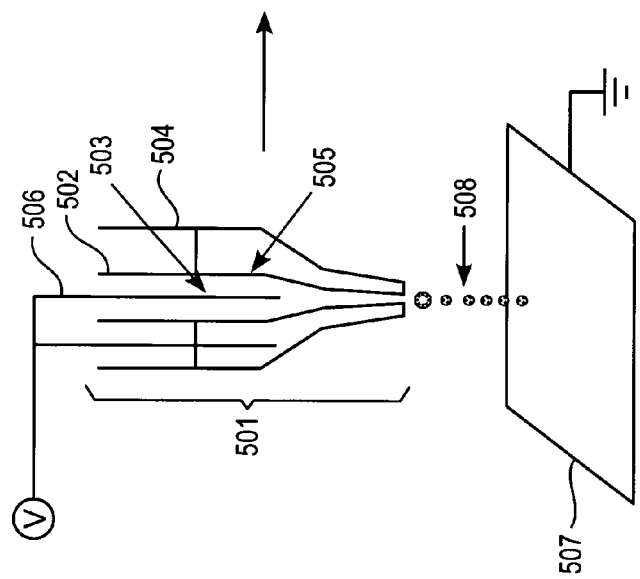
FIG. 5B is a schematic of a "copolymer micelle" capsule produced by co-axial electrospraying according to FIG. 5A.
Figure 5A:
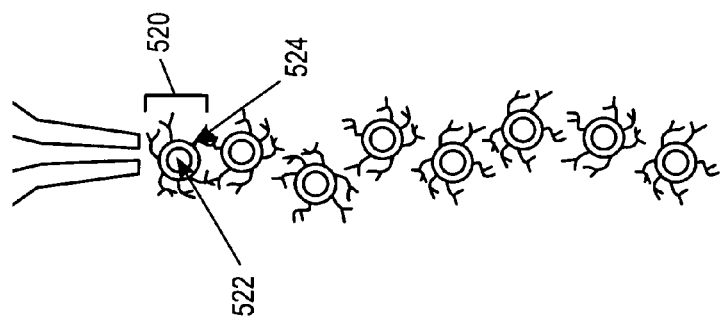
FIG. 5A is a schematic of a co-axial electrospraying apparatus including a dual-capillary spinneret loaded with flavorants in the inner capillary and block copolymers in the outer capillary for producing "copolymer micelle" capsules.

FIG. 5A is a schematic of a co-axial electrospraying apparatus including a dual-capillary spinneret loaded with flavorants in the inner capillary and block copolymers in the outer capillary for producing "copolymer micelle" capsules. In FIG. 5A, a spinneret 501 is shown comprising two co-axial capillaries, in which an inner capillary 502 along the center axis is loaded with flavorants and/or non-flavorant additives 503 that form a core of a capsule, and an outer capillary 504 concentrically surrounding the inner capillary 502 is loaded with block copolymers 505 that form the outer shell of a capsule. The flavorants 503 and block copolymers 505 within the capillaries can be maintained at a desired potential 506 by applying the potential to a conductive spinneret, in which each capillary is conductive but electrically isolated from the other capillary. The flavorants 503 and block copolymers 505 within the capillaries can be maintained at a high potential relative to a grounded target 507 such as a collection plate, for example. The molecules of flavorants 503 and block copolymers 505 can be extruded as components of a single "copolymer micelle" capsule 508. "Copolymer micelle" capsules 508 containing flavorants and/or non-flavorant additives are deposited onto a grounded target collector 507.

FIG. 5B is a schematic of a "copolymer micelle" capsule produced by co-axial electrospraying according to FIG. 5A. In FIG. 5B, an exemplary "copolymer micelle" capsule 520 is shown, in which the flavorants and/or non-flavorant additives are deposited into the inner core 522 and block copolymers are deposited into the outer shell 524. If the block copolymer comprises a first block polymer subunit exhibiting insolubility in a given solvent and a second block polymer subunit exhibiting solubility in the given solvent, then the first block polymer subunit is likely to form an outer shell encapsulating the flavorants internally within the core of the capsule, and the molecules of the second block polymer subunit can interact with the solvent more readily by orienting the molecules towards the solvent that enables maximum exposure to the solvent.

The polymers constituting a block copolymer may be sacrificial or non-sacrificial. During smoking, the flavorants and/or non-flavorant additives can be released from the "copolymer micelle" capsule when the mainstream smoke constituents chemically decompose the outer shell or provide thermal heating to promote thermal transition of the copolymers. As one embodiment, a "copolymer micelle" capsule is produced by co-axial electrospraying process employing a dual-capillary spinneret, in which the "copolymer micelle" capsule comprises a non-sacrificial copolymer formed as an outer shell and at least one flavorant and/or non-flavorant additive formed as an interior core, in which the flavorants and/or non-flavorant additives are released from the "copolymer micelle" capsule when exposed to mainstream smoke. As another embodiment, a "copolymer micelle" capsule is produced by co-axial electrospraying process employing a dual-capillary spinneret, in which the "copolymer micelle" capsule comprises a sacrificial copolymer formed as an outer shell and at least one flavorant and/or non-flavorant additive formed as an inner core, in which the flavorants and/or non-flavorant additives are released from the "copolymer micelle" capsule when exposed to mainstream smoke. A sacrificial copolymer is any block copolymer that comprises a sacrificial polymer subunit.

The "copolymer micelle" capsules having extensions emerging from the surface of the outer shell of the capsule, produced by methods illustrated in FIGS. 4 and 5, can be employed for flavorant encapsulation. Such "copolymer micelle" capsules having fibrous extensions from the surface of the capsule can enhance the level of interactions between the "copolymer micelle" capsules and the dendrites located on the surface of nerve cells constituting the human taste buds. The dendrites contain nerve receptors that sense the presence of stimulants, including flavorant molecules. For example, upon interaction with flavorant molecules, the dendrites of taste buds can send impulses to the brain to generate the sensation of taste. The "copolymer micelle" capsules, as microcapsules and nanocapsules, can bind more efficiently to taste receptors of dendrites by entangling the polymer extensions of the capsule with the dendrites of the taste buds. The retention of such "copolymer micelle" capsules comprising flavorant molecules by interactions with multiple dendrites of taste buds enable prolonged period of stimulation to provide a prolonged flavor-sensation effect. The sensation producing effect continues even after the taste buds relax to a steady state response because the entanglement of such "copolymer micelle" capsules causes the release of flavorant molecules from encapsulation within the shell of the capsule. The length of time for rupturing the shell of the capsule depends on the size of the nanocapsules and microcapsules encapsulating flavorants and/or nonflavorants, and on the thickness of the shell wall.

Figure 6:
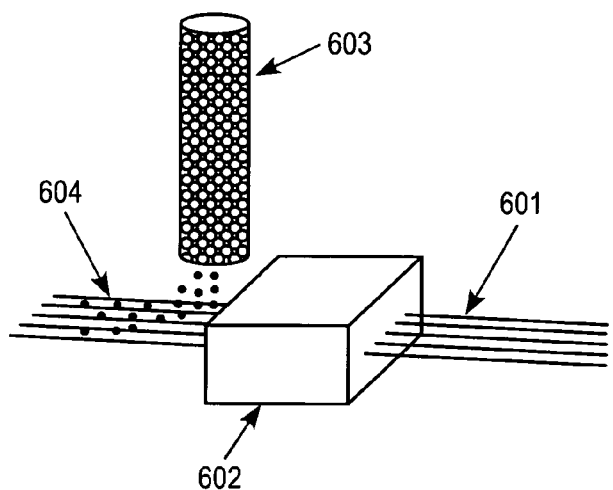
FIG. 6 is a schematic illustrating a process for introducing microcapsules and nanocapsules into a tow of filter material.

FIG. 6 is a schematic illustrating a process for introducing microcapsules and nanocapsules into a tow of filter material. In FIG. 6, an apparatus 603 dispenses the microcapsules and/or nanocapsules 604 produced by the electrospraying method described herein, onto a filter material tow 601, such as a cellulose acetate tow. The filter material may be further processed by a plasticizer booster 602 that adds a binder to the filter material.

Figure 7:
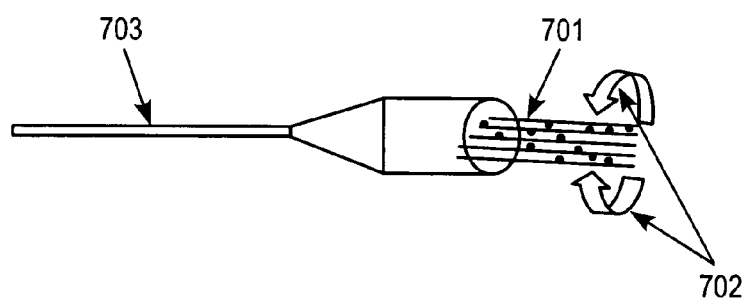
FIG. 7 is a schematic of a partially exploded perspective view of a cigarette filter rod produced by rolling together a tow of filter material assembled with microcapsules and/or nanocapsules containing flavorants, formed by a process illustrated in FIG. 6.

FIG. 7 is a schematic of a partially exploded perspective view of a cigarette filter rod produced by rolling together a tow of filter material assembled with microcapsules and/or nanocapsules containing flavorants and/or nonflavorant additives, formed by a process illustrated in FIG. 6. In FIG. 7, the tow of filter material assembled together with microcapsules and/or nanocapsules 701, as shown in FIG. 6, can be further processed by rolling 702 the tow of filter material that provides physical support for the microcapsules and/or nanocapsules. Mechanical packing, such as rolling, efficiently compacts or stabilizes the position of microcapsules and/or nanocapsules deposited within a rod of a filter 703, which is further combined with a tobacco rod in producing a smoking article.

In various embodiments, a smoking article that includes a filter composed of a capsule produced by electrospraying is provided, in which the capsule comprises at least one polymeric material that encapsulates or supports the retention of at least one flavorant and/or non-flavorant additive. In another embodiment, a smoking article that includes a filter composed of a "core-shell" capsule produced by electrospraying is provided, in which the "core-shell" capsule comprises at least one flavorant and/or non-flavorant additive as an inner core, and at least one polymeric material as an outer shell that encapsulates the contents of the inner core. In another embodiment, a smoking article that includes a filter composed of a "two-phase" matrix capsule produced by electrospraying is provided, in which the "two-phase" matrix capsule comprises at least one polymeric material in a continuous phase and at least one flavorant and/or non-flavorant additive in a dispersed phase in the form of a micro-emulsion. In another embodiment, a smoking article that includes a filter composed of a "copolymer micelle" capsule produced by electrospraying is provided, in which the "copolymer micelle" capsule comprises a sacrificial polymer or a non-sacrificial polymer as a shell. With respect to various types of capsules described herein, the filters and smoking articles that incorporate such types of capsules exhibit the properties described for the different types of capsules. For example, the content of the inner core of a "core-shell" capsule can be released when the structural integrity of the polymeric material that forms the shell is reduced or eliminated by chemical decomposition and/or thermal transition.

Figure 8:
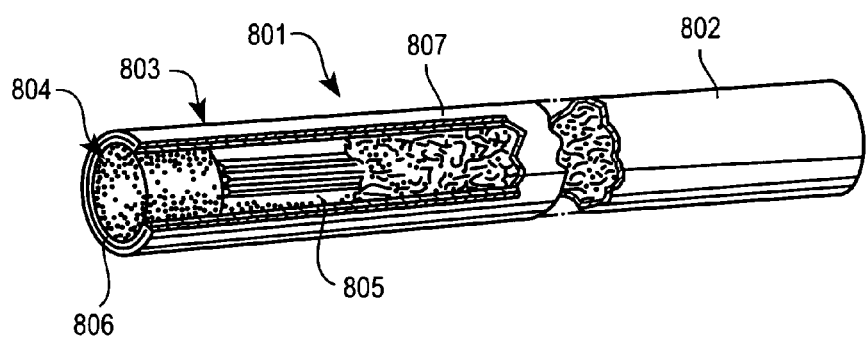
FIG. 8 is a schematic of a partially exploded perspective view of a cigarette showing various subsections of a cigarette that can be modified to incorporate a plurality of capsules produced by co-axial electrospraying.

FIG. 8 is a schematic of a partially exploded perspective view of a cigarette showing various subsections of a cigarette that can be modified to incorporate a set of capsules produced by co-axial electrospraying, as another embodiment. A cigarette filter comprising such capsules can be incorporated into any type of smoking article, including various types of cigarettes containing filter-like elements. The desired amount of flavorants and/or non-flavorant additives contained in a puff of tobacco smoke can be provided in the cigarette filter by adjusting the number of capsules employed in the cigarette filter. In FIG. 8, a cigarette 801 is illustrated that includes a tobacco rod 802, a filter 803, and a mouthpiece filter plug 804. The tobacco rod 802 and the filter 803 are joined together with tipping paper 807. The filter 803 may include a filter overwrap 806. The filter 803 can also be modified to create a void space into which the flavor-enhanced capsules can be inserted. The flavor-enhanced capsules can be incorporated into the mouthpiece filter plug 804 or inserted into a hollow cavity such as the interior of a free-flow sleeve 805 forming part of the filter 803. In one embodiment, a set of capsules can be inserted into a hollow portion of the cigarette filter. In another embodiment, a set of capsules can be inserted within a hollow cavity between two or more conventional cigarette filters such as plugs of cellulose acetate. Capsules enhanced with non-flavorant additives can be prepared as described for flavor-enhanced capsules for manufacturing smoking articles.

Figure 9:
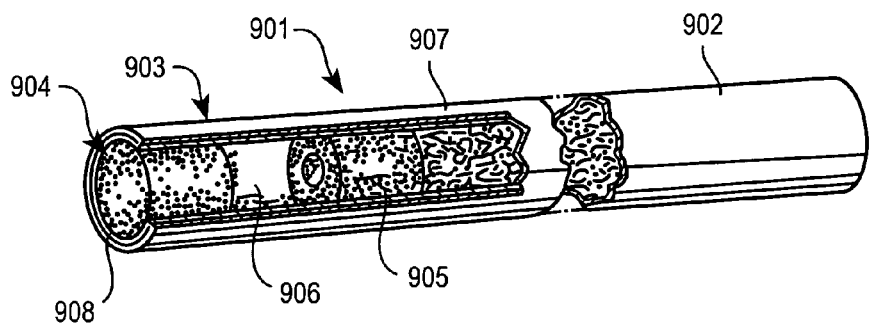
FIG. 9 is a partially exploded perspective view of a cigarette showing various subsections of a cigarette that can be modified to incorporate a plurality of capsules produced by co-axial electrospraying.

FIG. 9 is a partially exploded perspective view of a cigarette showing various subsections of a cigarette that can be modified to incorporate a set of capsules produced by co-axial electrospraying, as another embodiment. In FIG. 9, a cigarette 901 is illustrated that includes a tobacco rod 902 and a filter 903 in the form of a plug-space-plug filter. The filter 903 includes a mouthpiece filter 904, a space 906, and a plug 905. The plug can be in a form of a tube, and can be composed of a solid piece of material such as polypropylene or cellulose acetate capsules. The tobacco rod 902 and the filter 903 are joined together with tipping paper 907. The filter 903 may include a filter overwrap 908. The flavor-enhanced capsules can be incorporated into the mouthpiece filter 904, the plug 905, and/or the space 906. The flavor-enhanced capsules can be incorporated into any element of the filter of a cigarette. Capsules enhanced with non-flavorant additives can be prepared as described for flavor-enhanced capsules for manufacturing smoking articles.

In general, flavorants and non-flavorant additives can be released from a capsule into mainstream smoke via any known or unknown mechanisms. Regardless of the underlying mechanism, the bonds attaching molecules of an additive to a polymeric surface of a support structure can be broken upon exposure to the constituents of mainstream smoke, such as water vapor. For all described embodiments, the flavorants and/or non-flavorant additives are preferably released when the smoking articles composed of the capsules are puffed during average use by a smoker, in an amount sufficient to achieve the flavor-enhancing effect desired. For example, if the outer polymeric shell of "core-shell" capsules and "copolymer micelle" capsules, or the continuous polymeric matrix of "two-phase" matrix capsules are composed of sacrificial polymers, the additives can be released when the structural integrity of the polymeric material of the support is reduced or eliminated by a physical change in the polymeric material that may occur when the glass transition temperature, or the melting temperature of the shell, is exceeded within the filter. In addition, the structural integrity can be compromised when the sacrificial polymer is chemically decomposed by constituents in the mainstream smoke causing partial or complete decomposition of the shell at temperatures reached during smoking.

Partial decomposition of a sacrificial shell or a sacrificial matrix can be enhanced by the presence of a chemical or thermal gradient in the inflow direction of mainstream smoke. For example, if the temperature of the mainstream smoke at the tobacco rod end of a cigarette is relatively higher than the temperature at the mouthpiece end, the capsules will decompose at the distal end first (i.e., tobacco rod end) before consuming the proximal end (i.e., mouthpiece end) during puffing. If the concentration of the mainstream smoke at the tobacco rod end of a cigarette is relatively higher than the concentration at the mouthpiece end, the capsules will decompose at the distal end first (i.e., tobacco rod end) before consuming the proximal end (i.e., mouthpiece end) during puffing. By either means, the partial and progressive decomposition of the capsules can be achieved.

Capsules are useful for holding various flavorants and/or non-flavorant additives within the sub-compartments of the capsules, including the core compartment and the shell compartment. The partial or complete encapsulation provided by the capsules minimize or preclude volatilization of the additives, and decrease the amount of flavorants employed for manufacturing a smoking article. Smoking articles comprising such capsules may exhibit a reduction in "delivered total particulate matter" (TPM) when compared to standard flavored cigarettes not composed of such capsules. Smoking articles comprising such capsules may exhibit an increased shelf life by decreasing the rate of loss of additive molecules.

When menthol is employed as an additive, the amount preferably released per puff is in a range from about 6.0 μg to about 2.5 mg, or more preferably, from about 25 μg to about 125 μg. The total amount of menthol in a filter of a tobacco article such as a cigarette is preferably in a range from about 0.1 mg to about 1000 mg, or more preferably in a range from about 0.5 mg to about 5 mg.

Figure 10A:
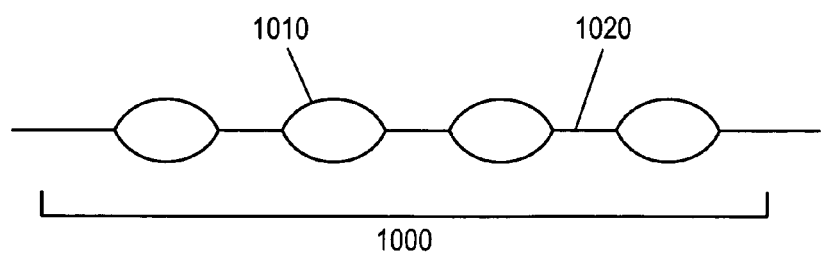
FIG. 10A is a schematic of a "beads-on-a-string" fiber produced by electrospinning.

FIG. 10A is a schematic of a "beads-on-a-string" fiber produced by electrospinning, as another embodiment. In FIG. 1A, an exemplary "beads-on-a-string" fiber 1000 that can be produced by pulsing the alternating current (AC) during DC electrospinning is shown. Such fibers can be formed by applying an AC pulse during the electrospinning process, in which the polymer solution is expelled through the nozzle of a spinneret of an electrospinning device. The AC pulse imparts positive and negative charges within localized regions of the expelled polymer, and causes these localized regions to collapse together in order to form neutral regions. As the AC pulse is repeatedly applied at certain intervals during fiber formation, the "beads-on-a-string" fiber 1000 is produced, in which the "beads" (or capsules), such as bead 1010, are formed during the DC phase of the electrospinning process, and the "string" component, such as string 1020, of the fiber is formed during the AC-pulse phase of the electrospinning process. The size of the beads/capsules and the length of the fiber between the beads/capsules can be modified by controlling the length, frequency, amplitude, and type (e.g., square, sine, triangle waveforms) of the AC pulse.

Figure 10B:
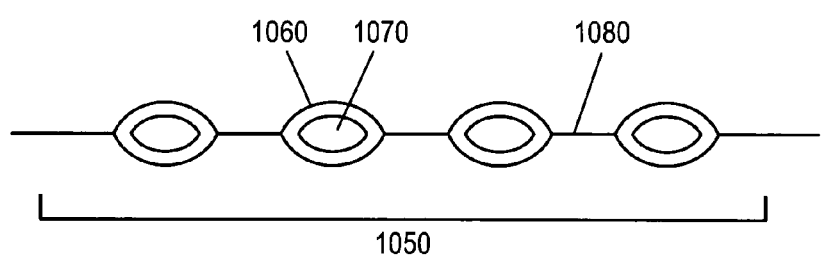
FIG. 10B is a schematic of a "beads-on-a-string" fiber containing flavorants and/or nonflavorants within in the bead component of the fiber.

FIG. 10B is a schematic of a "beads-on-a-string" fiber containing flavorants and/or nonflavorants within in the bead/capsule component of the fiber, as another embodiment. In FIG. 10B, an exemplary "beads-on-a-string" fiber 1050 is shown, in which the bead/capsule component 1060 comprises at least one flavorant and/or nonflavorant additive within the interior compartment 1070 of the bead, and the beads/capsules are separated by a string component, such as string 1080. The bead component containing one or more interior compartments can be produced by utilizing a coaxial electrospinning apparatus that can extrude simultaneously at least two different polymer solutions provided by distinct capillaries, and by pulsing the alternating current (AC) during the electrospinning process. Various polymers described throughout the present disclosure are suitable for producing such flavorants and/or nonflavorant additives. In one embodiment, at least two different polymer solutions that have differential properties can be extruded together to form the fiber, in which one or more of the polymer solutions includes flavorants. In another embodiment, at least one polymer solution and at least one liquid solution containing high concentration of flavorants can be extruded together to form the fiber, in which the liquid form of the flavorant is encapsulated by the polymer shell. Thus, various flavorants and/or nonflavorants can be deposited within the bead/capsule component of the "beads-on-a-string" fiber, in which an outer polymer shell encapsulates one or more flavorants and/or nonflavorant additives.

The "beads-on-a-string" fibers can be produced as microfibers and nanofibers. In one embodiment, cigarette filters comprising such "beads-on-a-string" fibers that can encapsulate various flavorants and/or nonflavorant additives are provided. In another embodiment, smoking articles, including cigarettes that include filters comprising such "beads-on-a-string" fibers that can encapsulate various flavorants and/or nonflavorant additives are contemplated. In another embodiment, methods for producing cigarette filters comprising such "beads-on-a-string" fibers are contemplated. In another embodiment, methods for producing smoking articles comprising cigarette filters that comprise such "beads-on-a-string" fibers are contemplated.

In one embodiment, a method for producing a filter of a smoking article comprises providing a filter support material; providing a capsule comprising at least one flavorant and/or a non-flavorant additive, and at least one polymer; and assembling together the filter support material with one or more capsules to form a filter, wherein the polymer stabilizes the retention of at least one flavorant and/or a non-flavorant additive within the filter in an initial unsmoked state, and wherein at least one polymer is modified by thermal transition and/or chemical decomposition so that at least one flavorant and/or a non-flavorant additive is released into a mainstream smoke. Suitable filter support materials are known in the art, and includes cellulose acetate and derivative thereof. Various methods for producing capsules by electrospraying or electrospinning are provided herein. In another embodiment, a filter comprises from about 100 to about 1,000,000 capsules per smoking article. In another embodiment, a filter comprises from about 200 to about 10,000 capsules per smoking article.

Although several embodiments have been described in reference to specific or preferred embodiments, variations and modifications of these embodiments will be apparent to persons skilled in the art. Such variations and modifications are to be considered within the purview and scope of the presented claims. Experimental procedures, materials, and expected results may be adjusted if the procedures will be scaled up or if additional factors are taken into consideration. Electrospraying processes (including co-axial electrospraying) have been described for a laboratory-scaled level of production. Further modifications are expected for making capsules on an industry-scaled level of production.

The following examples provide exemplary single-nozzle electrospraying and electrospinning experiments. By varying the electroprocessing conditions, a final product of any conformation and size can be produced, in the form of beads/capsules, fibers incorporated with beads/capsules, and fibers.

EXAMPLES

Example 1

Formation of Microbeads Composed of Polyvinylpyrrolidone (PVP)

A single spinneret electrospraying experiment was performed by loading a liquid comprising a 4.0 wt % solution of polyvinylpyrrolidone (PVP) (MW=40,000 g/mol) in 95% ethanol. The distance between the tip of a capillary needle and the grounded target plate was 20 cm. Vsc was nominally 12 kV, and the flow rate of core solution was set to 0.2 mL/hour. The experiment was performed at room temperature and at atmospheric pressure. The total time of electrospraying was 30 min. The microbeads formed by the process were relatively uniform in size and shape, having an average diameter of 2-5 micrometers (μm), as determined by optical microscopy analysis.

Example 2

Formation of Microbeads Composed of Cellulose Acetate (CA)

A single spinneret electrospraying experiment was performed by loading a liquid comprising a 10.0 wt % solution of CA in a mixture of acetone and 1,3-dioxolane (90 wt % acetone and 10 wt % 1,3-dioxolane). The distance between the tip of a capillary needle and the grounded target plate was 20 cm. Vsc was nominally 12 kV, and the flow rate of core solution was set to 0.4 mL/hour. The experiment was performed at room temperature and at atmospheric pressure. The total time of electrospraying was 3 min. The microbeads formed by the process were relatively uniform in size and shape, having an average diameter of 2-5 micrometers (μm), as determined by optical microscopy analysis.

Example 3

Formation of Fibers Incorporated with Microbeads and Composed of Cellulose Acetate (CA)

A single spinneret electrospinning experiment was performed by loading a liquid comprising a 15.0 wt % solution of cellulose acetate (CA) in a mixture of acetone and N,N-Dimethylformamide (DMF) (80 wt % acetone and 20 wt % DMF). The distance between the tip of a capillary needle and the grounded target plate was 20 cm. Vsc was nominally 12 kV, and the flow rate of core solution was set to 0.4 mL/hour. The experiment was performed at room temperature and at atmospheric pressure. The total time of electrospraying was 3 min. The fibers incorporated with microbeads ("beads-on-a-string fibers") were fine in diameter, in which the average fiber diameter ranges from about several hundred nm to 1 μm, and in which the average bead diameter is about a few μm, as determined by optical microscopy analysis.

Example 4

Formation of Cellulose Acetate (CA) Bead-Free Fibers

A single spinneret electrospinning experiment was performed by loading a liquid comprising a 15.0 wt % solution of CA in a mixture of acetone and 1,3-dioxolane (90 wt % acetone and 10 wt % 1,3-dioxolane). The distance between the tip of a capillary needle and the grounded target plate was 20 cm. Vsc was nominally 12 kV, and the flow rate of core solution was set to 0.4 mL/hour. The experiment was performed at room temperature and at atmospheric pressure. The total time of electrospraying was 3 min. The fibers were fine in diameter, in which the average fiber diameter ranges from about 1-3 μm, as determined by optical microscopy analysis.

It will be appreciated that, although specific embodiments have been described herein for purposes of illustration, various modifications may be made without departing from the spirit and the scope of the embodiments.

What is claimed is:

1. A method for manufacturing a filter of a smoking article, the method comprising:
    producing a plurality of electroprocessed capsules;
    depositing the electroprocessed capsules onto a filter tow material comprising cellulose acetate tow;
    rolling the filter tow material so as to stabilize the position of the electroprocessed capsules therein and form a filter segment, said electroprocessed capsules comprising at least one flavorant; and at least one polymer; and
    forming a filter including the filter segment.

2. The method of claim 1, wherein the electroprocessed capsules are portions of an electrospun fiber having enlarged diameters with respect to the diameter of the electrospun fiber, and are spaced along and integral with the electrospun fiber.

3. The method of claim 1, wherein (i) each electroprocessed capsule has a substantially spherical cross-sectional shape, and an outer diameter from about 10 nanometers (nm) to about 50 micrometers (μm), (ii) the polymer stabilizes the retention of the flavorant in an initial unsmoked state, (iii) the polymer is a sacrificial polymer that loses structural integrity by heating and/or chemical decomposition, sufficient to release the flavor, and/or (iv) the flavorant is selected from the group consisting of menthol, eugenol, spearmint, peppermint, cocoa, vanilla, cinnamon, licorice, citrus flavor, fruit flavors, and a combination thereof.

4. The method of claim 2, wherein each electroprocessed capsule has an outer diameter from about 10 nanometers (mm) to about 10 micrometers (μm), or from about 20 nanometers (mm) to about 3 micrometers (μm).

5. The method of claim 1, wherein each electroprocessed capsule is a core-shell electrosprayed capsule comprising:
    at least one flavorant that forms an inner core of the electroprocessed capsule; and
    at least one polymer that forms an outer shell of the electroprocessed capsule encapsulating the flavorant.

6. The method of claim 1, wherein each electroprocessed capsule is a two-phase matrix electrosprayed capsule comprising:
    at least one flavorant that forms a dispersed phase; and
    at least one sacrificial polymer forms a continuous phase.

7. The method of claim 1, wherein each electroprocessed capsule is a copolymer micelle capsule comprising:
    at least one flavorant that forms an inner core of the capsule; and
    a block copolymer comprising two or more subunits of block polymers, wherein at least one block polymer subunit of the block copolymer forms an outer shell of the capsule.

8. The method of claim 7, wherein the block copolymer comprises at least one block polymer subunit that forms fiber extensions emerging from the surface of the outer shell of the capsule.

9. The method of claim 1, wherein each electroprocessed capsule is a core-shell capsule produced by
    loading a first capillary of a spinneret of a co-axial electrospraying apparatus with at least one flavorant;
    loading a second capillary of the spinneret with at least one polymer;
    extruding from the spinneret an electroprocessed capsule comprising at least one flavorant that forms an inner core of the electroprocessed capsule, and at least one polymer that forms an outer shell of the electroprocessed capsule encapsulating the flavorant; and
    collecting the electroprocessed capsule on a grounded target.

10. The method of claim 1, wherein each electroprocessed capsule is a two-phase matrix capsule produced by
    loading a single capillary of a spinneret of an electrospraying apparatus with at least one flavorant combined with at least one sacrificial polymer;
    extruding from the spinneret an electroprocessed capsule comprising the flavorant formed as a dispersed phase, and the sacrificial polymer formed as a continuous phase, wherein the dispersed phase and the continuous phase are mixed together to form a micro-emulsion so that the flavorants additives are encapsulated by the polymeric matrix; and
    collecting the electroprocessed capsule on a grounded target.

11. The method of claim 1, wherein each electroprocessed capsule is a copolymer micelle produced by loading a first capillary of a spinneret of an electrospraying apparatus with at least one flavorant;

loading a second capillary of the spinneret with a block copolymer comprising two or more subunits of block polymers;

extruding from the spinneret a capsule comprising at least one flavorant that forms an inner core of the capsule, and at least one type of block polymer subunit that forms an outer shell of the capsule encapsulating the flavorant; and collecting the capsule on a grounded target.

12. The method of claim 11, wherein the block copolymer comprises at least one block polymer subunit that forms fiber extensions emerging from the surface of the outer shell of the capsule.

13. The method of claim 1, wherein each electroprocessed capsule is formed along the length of a fiber by electrospinning and is produced by loading a first capillary of a spinneret of a co-axial electrospinning apparatus with at least one flavorant;

loading a second capillary of the spinneret with at least one polymer;

extruding from the spinneret an electroprocessed capsule comprising at least one flavorant that forms an inner core of the electroprocessed capsule, and at least one polymer that forms an outer shell of the electroprocessed capsule encapsulating the flavorant; and collecting the electroprocessed capsule on a grounded target.

14. The method of claim 1, wherein each electroprocessed capsule is produced by electrospraying at least one flavorant; and at least one polymer.

* * * * *